(12) United States Patent
Saulsbury et al.

(10) Patent No.: US 10,054,927 B2
(45) Date of Patent: Aug. 21, 2018

(54) METHOD AND APPARATUS FOR COMPONENT ASSEMBLY USING CONTINUOUS SELECTION

(71) Applicant: Apple Inc., Cupertino, CA (US)

(72) Inventors: Ashley N. Saulsbury, Los Gatos, CA (US); Nicholas I. Reid, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 414 days.

(21) Appl. No.: 14/813,417

(22) Filed: Jul. 30, 2015

(65) Prior Publication Data

US 2015/0331410 A1    Nov. 19, 2015

Related U.S. Application Data

(63) Continuation of application No. 13/549,402, filed on Jul. 13, 2012, now Pat. No. 9,134,724.
(Continued)

(51) Int. Cl.
*G06F 19/00* (2018.01)
*G05B 19/19* (2006.01)
(Continued)

(52) U.S. Cl.
CPC ........ *G05B 19/19* (2013.01); *G05B 19/41805* (2013.01); *G05B 19/41865* (2013.01);
(Continued)

(58) Field of Classification Search
CPC .................................................... G06Q 10/06
(Continued)

(56) References Cited

U.S. PATENT DOCUMENTS 5,231,675 A    7/1993  Sarr et al.
5,232,331 A    8/1993  Kasai et al.
(Continued)

FOREIGN PATENT DOCUMENTS

CN    1254106 A    5/2000
CN    1320874 A    11/2001
(Continued)

OTHER PUBLICATIONS

Mease, David, Vijayan N. Nair, and Agus Sudjianto, "Selective assembly in manufacturing: statistical issues and optimal binning strategies." Technometrics 46.2 (2004): 1-26.
(Continued)

*Primary Examiner* — A Hunter Wilder
(74) *Attorney, Agent, or Firm* — Dickinson Wright RLLP

(57) ABSTRACT

A manufacturing process for providing an assembly formed of a first piece and a best fitted second piece is described. The manufacturing process is carried out by performing at least the following operations: receiving the first piece characterized in accordance with at least a first attribute, selecting the best fitted second piece from a buffer, the selecting based in part upon a best matching value of a second attribute in relation to the first attribute, replacing the selected best fitted second piece with another second piece such that the number of second pieces in the buffer remains about the same, and forming the assembly the first part and the second part to form the assembly.

15 Claims, 14 Drawing Sheets

Related U.S. Application Data

(60) Provisional application No. 61/658,851, filed on Jun. 12, 2012.

(51) Int. Cl.
  *G06Q 10/06* (2012.01)
  *G05B 19/418* (2006.01)

(52) U.S. Cl.
  CPC ... *G06Q 10/06* (2013.01); *G05B 2219/31036* (2013.01); *G05B 2219/31049* (2013.01); *G05B 2219/37212* (2013.01); *Y02P 90/04* (2015.11); *Y02P 90/20* (2015.11); *Y10T 29/49764* (2015.01)

(58) Field of Classification Search
  USPC .................................................. 700/95, 117
  See application file for complete search history.

(56) References Cited

U.S. PATENT DOCUMENTS

| | | | |
|---|---|---|---|
| 5,633,968 | A | 5/1997 | Sheem et al. |
| 5,787,577 | A | 8/1998 | Kent |
| 6,190,224 | B1 | 2/2001 | Byun et al. |
| 6,314,337 | B1 | 11/2001 | Marcum |
| 6,738,680 | B2 | 5/2004 | Nesbitt |
| 6,963,824 | B1* | 11/2005 | Davidson ............ G06F 17/50 342/442 |
| 6,996,440 | B2 | 2/2006 | Maenishi et al. |
| 7,197,224 | B2 | 3/2007 | Rolston et al. |
| 7,266,422 | B1 | 9/2007 | DeMotte et al. |
| 7,539,630 | B2 | 5/2009 | Crampton et al. |
| 8,076,178 | B2 | 12/2011 | Krishnamoorthy et al. |
| 8,272,195 | B2 | 9/2012 | Harding et al. |
| 2003/0208903 | A1* | 11/2003 | Morbitzer ............ B23P 19/001 29/791 |
| 2006/0113638 | A1* | 6/2006 | Maaskant ......... H01L 31/03528 257/623 |
| 2006/0129259 | A1 | 6/2006 | Tornquist et al. |
| 2009/0118858 | A1 | 5/2009 | Wallace et al. |
| 2010/0061055 | A1 | 3/2010 | Dabov et al. |
| 2013/0326851 | A1 | 12/2013 | Woodhull et al. |

FOREIGN PATENT DOCUMENTS

| | | |
|---|---|---|
| CN | 1466864 A | 1/2004 |
| CN | 1706718 A | 12/2005 |
| CN | 101456128 A | 6/2009 |
| TW | 431933 B | 5/2001 |

OTHER PUBLICATIONS

Matsuura, Shun, and Nobuo Shinozaki. "Shifting the process mean to minimize surplus components and unacceptable products in selective assembly." Journal of Quality vol. 18.2 (2011): 87.
Thesen, Arne, and Akachai Jantayavichit. "Design and evaluation of a selective assembly station for high precision scroll compressor shells." Proceedings of the 31st conference on Winter simulation: Simulation—a bridge to the future—vol. 1. ACM, 1999.
Asha et al., Optimization of Clearance Variation in Selective Assembly for Components with Multiple Characteristics, Jul. 12, 2007, Springer-Verlag London Limited, Int J Adv Manuf Technol (2008) 38: 1026-1044.
Barnett et al., "Distributed scheduling to support mass customization in the shoe industry", International Journal of computer Integrated Manufacturing, Oct.-Nov. 2004, vol. 17, No. 7, pp. 623-632.
Evans et al., "Mechanized Assembly of Multichip Modules", IEEE/CHMT International Electronixs Manufacturing Technology Symposium, 1993, pp. 262-270.
Chinese Application for Utility Model No. 201320507995.1—First Office Action dated Sep. 27, 2013.
Chinese Application for Utility Model No. 201320506026.4—First Office Action dated Oct. 14, 2013.
Chinese Application No. 201310364162.9—First Office Action dated Jun. 15, 2015.
Chinese Application for Invention No. 201310361573.2—First Office Action dated Jul. 10, 2015.
Chinese Application No. 201310364162.9—Second Office Action dated Feb. 19, 2016.
Chinese Application No. 201310364162.9—Office Action dated Aug. 18, 2016.
Chinese Application for Invention No. 201310364162.9—Office Action dated Feb. 4, 2017.
Chinese Application for Invention No. 201310364162.9—Fifth Office Action dated Sep. 5, 2017.

* cited by examiner

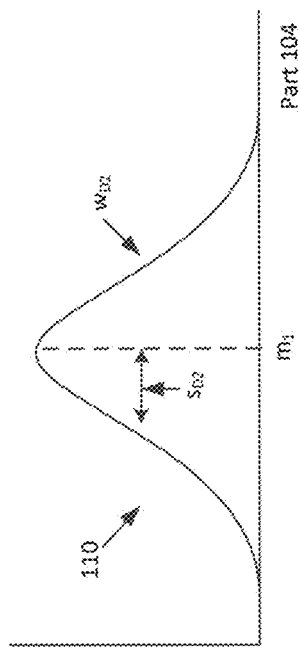
Fig. 1A
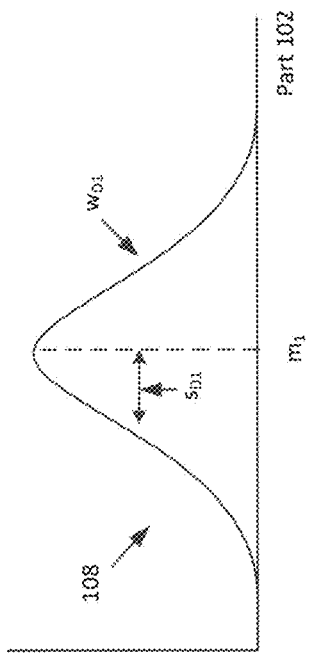
Fig. 1B
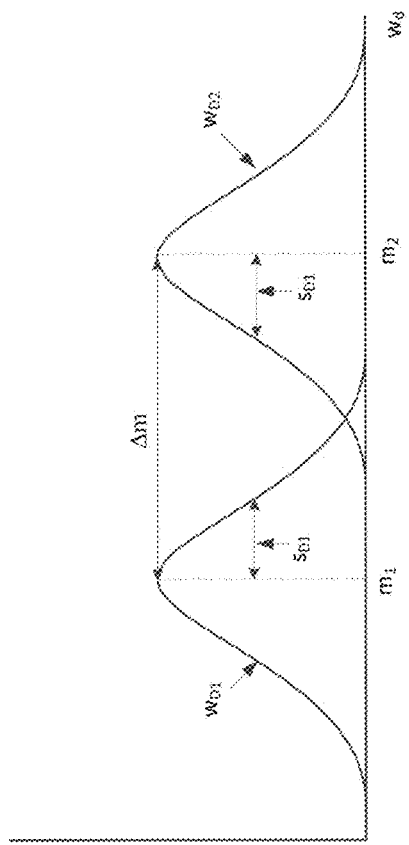
Fig. 1C
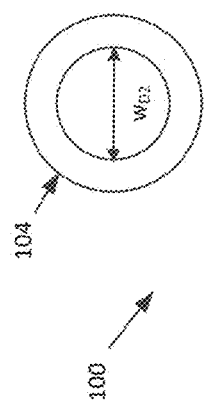
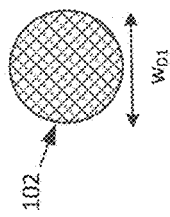
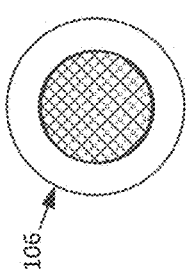

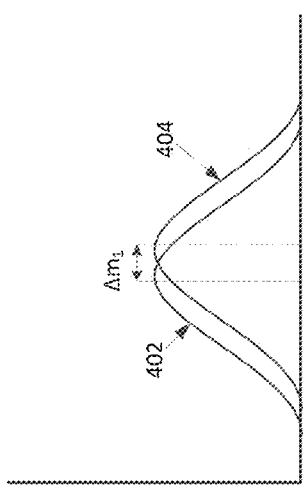
FIG. 4A
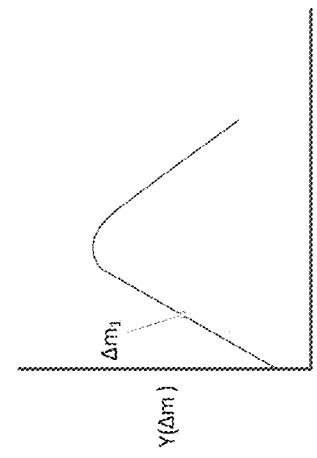
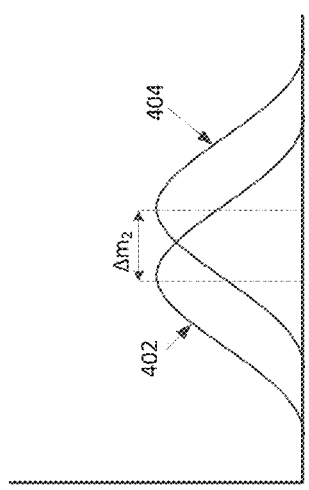
FIG. 4B
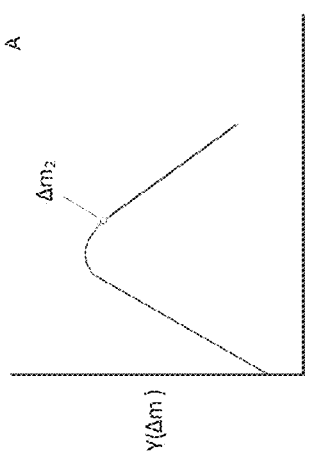
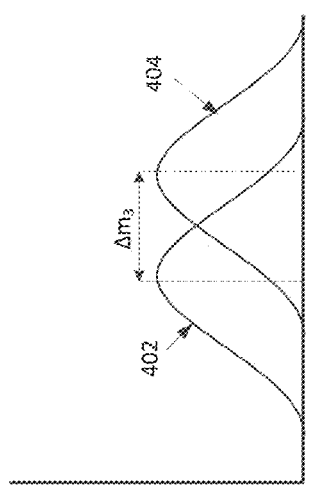
FIG. 4C
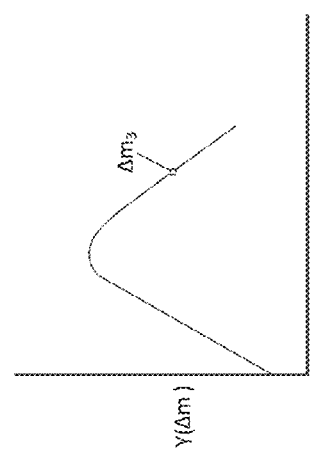

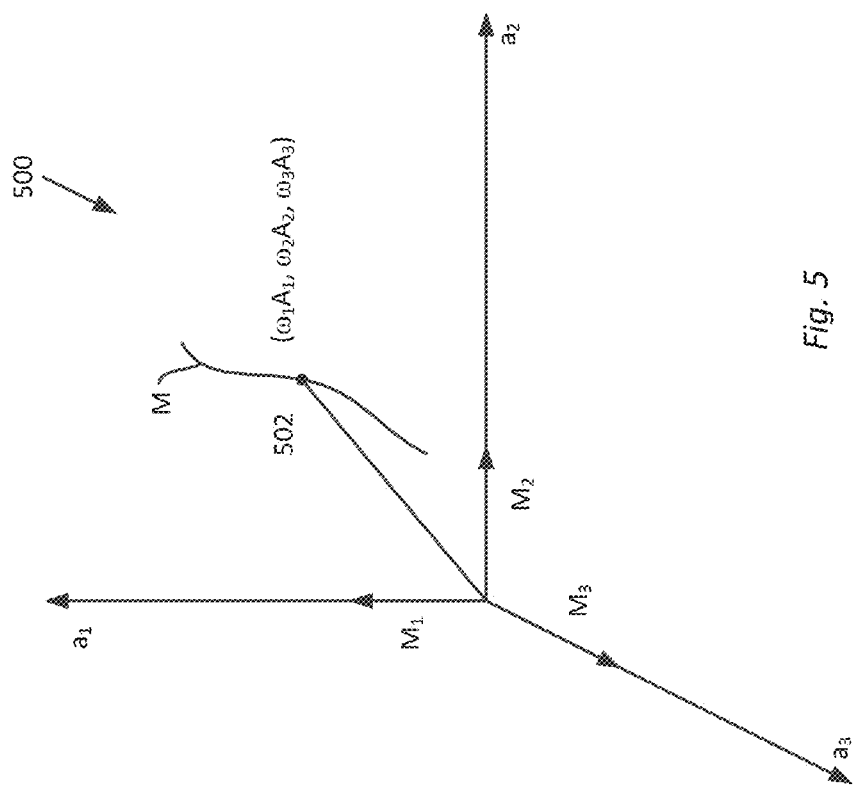

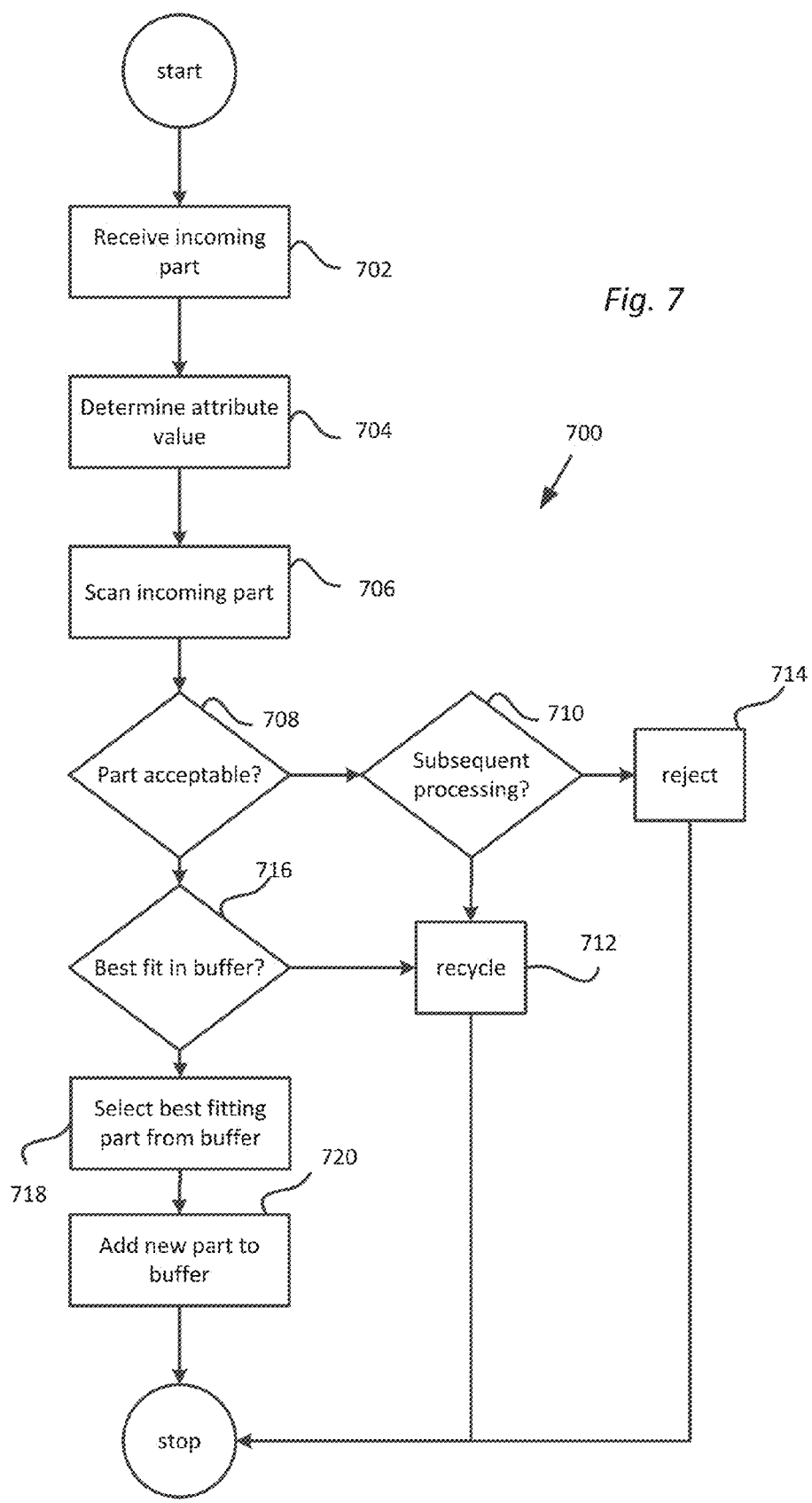

METHOD AND APPARATUS FOR COMPONENT ASSEMBLY USING CONTINUOUS SELECTION

CROSS-REFERENCE TO RELATED APPLICATION

This application is a continuation of U.S. application Ser. No. 13/549,402, filed Jul. 13, 2012, entitled "METHOD AND APPARATUS FOR COMPONENT ASSEMBLY USING CONTINUOUS SELECTION", which claims priority under 35 U.S.C. § 119(e) to U.S. Provisional Application No. 61/658,851, filed Jun. 12, 2012, entitled "METHOD AND APPARATUS FOR COMPONENT ASSEMBLY USING CONTINUOUS SELECTION", which are incorporated by reference herein in their entirety herein for all purposes.

FIELD

The described embodiments generally relate to manufacturing. In particular, assembly of manufactured parts using continuous selection is described.

BACKGROUND

In manufacturing products are typically assembled from multiple parts. Those parts are often made of different materials and/or constructed using different manufacturing steps. Consequently the yield of "good" assembled products is a function of at least two factors, control of the manufacturing steps to ensure functioning and/or in-specification components, and the specific tolerances of the assembled product.

In most cases, designers strive to ensure that individual components are manufactured with tight enough tolerances such that when the parts are brought together and assembled, the final product meets its overall specifications. For example, the process to cut glass for a window is usually sufficiently controlled so that it is neither too big nor too small for a corresponding window frame. Similarly, window frames are manufactured to a certain size and tolerance to ensure that the corresponding glass will fit. Accordingly, both the glass and the frame are cut to some nominal size(s) so that when assembled the gap between then is within the required gap specification. Despite variations between pieces during manufacturing, tolerances are sufficiently controlled to ensure that the pieces fit together appropriately.

However, when design tolerances approach or exceed the ability of the manufacturing processes to build individual components, the yield of assembled pieces decreases because the probability of finding two compatible components at random decreases. Situations like this can arise for cosmetic reasons, such as minimizing the gap between two pieces, or ensuring continuity of color between two different materials. For situations where the assembled design tolerances significantly exceed the manufacturing capability of components other techniques are required in order to maintain the yield of assembled products.

Therefore, accurate and reliable techniques for selecting parts for assembly of a manufactured product is desired.

SUMMARY

This paper describes various embodiments that relate to a system, method, and apparatus for passively providing information from an accessory device to a host device. In one embodiment, the accessory device takes the form of a protective cover and the host device takes the form of a tablet computer.

In one embodiment, manufacturing process is described. The manufacturing process is carried out by determining an attribute value of a first part, the attribute value used to identify a best matching second part from a buffer of N second parts, using the first part attribute value to identify the best matching second part from the buffer of N second parts in accordance with a second part attribute value and only if the best matching second part attribute value is within a range of acceptable second part attribute values, removing the identified best matching second part from the buffer and maintaining the buffer at N second parts by replacing the removed best matching second part from the buffer with a replacement second part. Otherwise the first part is designated as not matched.

In another embodiment, an apparatus for performing a manufacturing assembly operation is described. The apparatus includes at least means for determining an attribute value of the first part, the attribute value used to identify a best matching second part from a buffer of N second parts, means for selecting the best matching second part from the buffer of N second parts, the selecting in accordance with the attribute value of the first part, means for removing the selected best matching part from the buffer, and means for replacing the removed best matching second part from the buffer with a replacement second part such that there remain N second parts in the buffer.

In yet another embodiment, an inventory control method performed in a continuous selection manufacturing process is described. The inventory control method is carried out by receiving an incoming first part and determining an attribute value of the first part, the attribute value used to identify a best matching second part from a buffer of N second parts. Only if the attribute value of the best matching second part is within an acceptable range of second part attribute values, identifying the best matching second part from the buffer of N second parts, then removing and replacing the identified best matching second part. Otherwise, designating the incoming first part as a not matched first part.

Non-transitory computer readable medium executable by a processor in a computer assisted manufacturing process includes at least computer code for providing an incoming first part, computer code for selecting an attribute of the first part, the attribute used in part to select a best matching second part from a buffer of N second parts, computer code for determining an attribute value of the first part, computer code for selecting the best matching second part from the buffer of N second parts, the selecting in accordance with the attribute value of the first part, computer code for removing the selected best matching part from the buffer, and computer code for replacing the removed best matching second part from the buffer with a replacement second part such that there remain N second parts in the buffer.

In still another embodiment, a manufacturing apparatus is described. The manufacturing apparatus includes at least a selection mechanism configured to receive an incoming first part, determine an attribute value of the first part use the attribute value used to identify a best matching second part from a buffer of N second parts, select and remove the best matching second part from the buffer of N second parts, and replace the removed best matching second part from the buffer with a replacement second part such that there remain N second parts in the buffer.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which:

FIGS. 1A-1C graphically illustrates assembly process arranged to assemble parts into an assembly that generally relies upon a selected attribute, or attributes, of the parts.

FIGS. 4A-4C illustrate the relationship between mean offset value and the yield curve shown in FIG. 3.

FIG. 5 graphically illustrates how merit function M can be multi-dimensional having various attributes such as color, size, rotation that form components in what can be referred to as a multi-dimensional attribute space $S_A$.

FIG. 7 shows a flowchart detailing assembly process in accordance with the described embodiments.

DETAILED DESCRIPTION

Figure 2B:
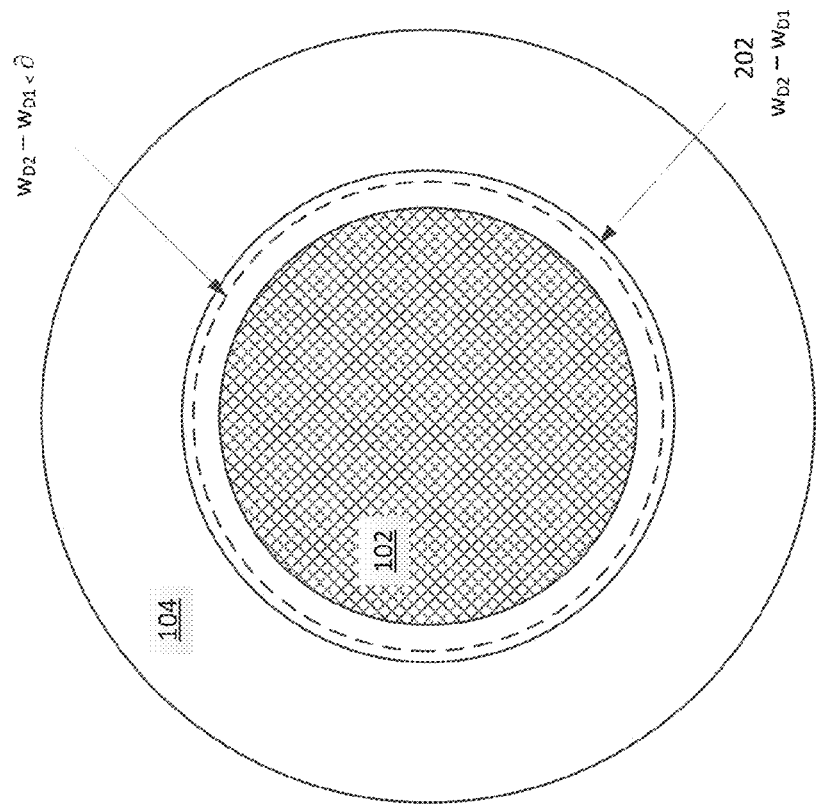
FIGS. 2A and 2B that show more detailed relationship of the parts shown in FIGS. 1A-1C.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a manufacturing assembly operation and process that can embody concepts that can be employed separately or in conjunction for assembling components to tolerances beyond the ability of their manufacture. A first concept is referred to as "continuous selection" by which it is meant that the best fitting two components can be selected from a continuously updated pool of components. A second concept can be described in terms of a mechanism of inventory control that can ensure matching statistical distributions of these components to minimize yield loss and ensure that as many components can be matched together as possible. It should be noted that although the embodiments are described (for simplicity) in the context of two components to be assembled, it is clear that the processes described can be extrapolated to handle the assembly of multiple components simultaneously. Furthermore, the basic principles of operation described herein can be implemented as a fully automated, a semi-automated or an entirely manual manufacturing process.

For the manufacture of any physical component, there will generally be a statistical distribution of values for any attribute of interest. Typical attributes of interest can include physical attributes such as length, height, color, weight. Other attributes can be referred to as relational attributes between various components. Relational attributes can include relative size, relative weight, and so on. Relational attributes can be useful can various components are mated in an assembly operation. For the most part, the statistical distribution of attribute values is generally Normal (Gaussian) in nature (or a close approximation). In other words, for a group of components, as the number of components in the group increase, the tendency of a particular attribute is to symmetrically group about values that are close to the mean value of the attribute for the group. Therefore, for sake of simplicity only, the following discussion presumes that all distributions described herein are essentially Gaussian in nature and that for assembly the statistical distribution of component attributes is the same. It should be noted, however, this is not a necessary factor for the described embodiments and should not be construed as limiting in any manner.

In the described embodiment, the process of continuous selection is based upon the idea that amongst a randomly selected pool of components to be assembled there is a very high probability that there will be a set of components that fit together with the best possible match of any desired attribute(s). For example, between a bag of screws and a bag of fittings, there is a high probability that there is at least one screw that best fits a given fitting. This can also be extrapolated to the assembly of multiple components. Amongst a given pool of pieces there will be a combination that fit together best. Clearly the larger the pool(s) of components from which to select from the better the fit of the best fitting components will be. Put differently, the more components from which to select, lowers the probability that the best fitting components will still be a poor fit. In the limit, with an infinite pool of components there will always be a set of components that are a perfect match. Therefore, a critical variable in this methodology is the selection of a pool size which given the statistical distribution of components and will ensure an acceptable yield of assembled parts.

In one embodiment, a continuous selection process can be implemented in an assembly operation involving a first part paired with a matching, or best fit, second part. In one implementation, the first part is identified and a pre-selected attribute is measured. A second part in the form of a best fitting component is selected from a pool (or buffer) of candidate components. As a pair formed of the first and second (or set if more than two candidate parts) of best fitting parts are identified, the best fitting second part is removed from the pool and matched with the first part. The result of the selection is to reduce the pool size (i.e., the number of components available for selection) which in turn reduces the probability of a subsequent best fit. Consequently, as a matching part is removed from the buffer, a new part(s) is inserted into the selection pool ensuring a constant pool size as well as a predicable yield of assemblies.

For example, during an assembly of a portable media device, housing for the portable media device can be selected. An opening in the housing used to accommodate a cover glass used to protect a display assembly can be measured. In this situation, a gap value being a difference in size between the opening in the housing and the cover glass can be the attribute of interest. Therefore, in accordance with the process, for a particular housing, the size of the opening can be used to find best fitting cover glass by which it is meant that a maximum gap value is less than a pre-defined design specification value. Once the best fitting cover glass is identified and removed from the buffer of cover glass(s), another cover glass can be inserted into the pool in order to maintain the size of the pool of cover glass(s) substantially constant. In this way, a probability that a subsequent housing can be matched with a best fit cover glass can be maintained as acceptable.

Variation in manufacturing processes can result in a drift, or variation, in characteristics of both incoming components and candidate component from which is selected a best match. Therefore, in some embodiments, both the distribution and/or number of candidate components can be varied in order to compensate for the shift in manufacturing process. In this way, assembly yield can be maintained at an acceptable level regardless of any variation in the manufacturing processes used to produce either the incoming components or candidate components.

In one embodiment, an inventory control protocol can be based upon a determination of process drift associated with a change in a mean value of a distribution of an attribute of interest. In another embodiment, a distribution of candidate components can be altered by replacing a matched component with a component pre-sorted in such a way that a distribution of candidate components becomes more like that of the incoming components. In this way, the likelihood of finding a matching component for an incoming component is commensurably increased. In another embodiment, an oldest not-matched part in the buffer can be removed and replaced. The removed part can be recycled when a distribution of incoming parts indicates that the removed part is likely to be matched with an incoming part. In another embodiment, the incoming parts can be characterized and if there is no part in the current buffer population that will match the incoming part and be within an outgoing specification, then the incoming part can also be set aside if and until the distribution of candidate parts in the buffer has changed such that the removed incoming part can be matched with the finished product being deemed acceptable.

These and other embodiments are discussed below with reference to FIGS. 1-12. However, those skilled in the art will readily appreciate that the detailed description given herein with respect to these figures is for explanatory purposes only and should not be construed as limiting.

FIGS. 1A-1C graphically illustrates assembly process 100 arranged to assemble part 102 and part 104 into finished product 106 that generally relies upon a selected attribute, or attributes, of part 102 and part 104. If, for example, part 102 takes the form of peg 102 having outer diameter $W_{D1}$ and part 104 takes the form of collar 104 having inner diameter $W_{D2}$, then assembly process 100 can require that peg 102 be inserted into collar 104 to form finished product 106. In order to model assembly process 100, it can be presumed that a selected attribute of any component required in assembly process 100 exhibits a random variation that conforms to a normal, or Gaussian, probability distribution. In this way, for example, peg 102 can have a selected attribute in the form of diameter $W_{D1}$ that exhibits a random variation along the lines shown in graph 108 and collar 104 can have a selected attribute in the form of inner diameter $W_{D2}$ that exhibits a random variation along the lines shown in graph 110 each of which are in the form of a normal or Gaussian distribution.

As well known in the art, a normal distribution can be characterized by a mean (m) and a standard deviation ($S_D$) that shows how much variation or dispersion exists from the mean. In other words, a low standard deviation indicates that the data points tend to be very close to the mean, whereas high standard deviation indicates that the data points are spread out over a large range of values. Accordingly, with regards to a manufacturing process, the standard deviation of the distribution of an attribute for a part can be a measure of a capability of the process with regard to that attribute used to manufacture the part. In other words, a well controlled process can produce a number of parts having an attribute whose variation about the mean is small (i.e., a low standard deviation) whereas a process that is less well controlled will produce parts having an attribute whose variation about the mean is greater and therefore has a higher standard deviation.

For example, standard device $S_{D1}$ of distribution 108 can indicate an amount of control used to manufacturing peg 102. In other words, if the manufacturing process used to form peg 102 is well controlled, then the distribution of peg widths ($w_{D1}$) about mean $m_1$ will be small as indicated by a low value for standard device $S_{D1}$ and narrower graph 108. On the other hand, if the manufacturing process used to form peg 102 is less well controlled then the observed values for peg width ($w_{D1}$) are dispersed more broadly about mean $m_1$ and standard device $S_{D1}$ will have a larger value and graph 108 will be flatter and more spread out.

In order to assure that the majority of parts have a match (i.e., a peg fits into a collar), the standard distributions are made small enough or the mean values are far enough apart that the number of pegs that are too big to fit in the holes is small. Accordingly, the relationship between the distributions of components in any assembly process can have significant impact on the overall yield of that assembly process. For example, by setting the distributions of the components such that there is substantial overlap between the distributions (i.e.; SD is >> than Δm), then the assembly yield can be greater than 99% since the number of parts that cannot be matched due to attribute incompatibility is very small. Although the overall yield may be high, the number of assembled parts that pass an outgoing quality check based on a particular design specification, such as a gap distance between peg 102 and collar 104, can be reduced to the point where an effective yield cannot meet the requirements of the design specification and the assembled part can be rejected. Rejecting already assembled parts is problematic use of resources due to the time and cost involved in processing that is ultimately to no avail.

In the context of this discussion, assembly yield can be defined as the probability that a first component (such as collar 104) can be successfully matched with a best fitting second component (such as peg 102) based upon at least one attribute. Yield can depend upon many factors such as the number of available components as well as the distribution of those components with regards to an attribute of interest. Therefore, in order to maximize yield as well as compensate for any manufacturing based drift, it can be a significant advantage in an actual manufacturing environment to be able to control, or at least modify, both the number and distribution of candidate components.

As discussed above, one technique that can be used to monitor manufacturing drift is based upon the standard deviation of a distribution of an attribute. In other words, a manufacturing process associated with a low value for standard deviation can provide a larger number of parts that do not exhibit a large variance from the mean of the distribution. However, any changes in the manufacturing process can influence the standard deviation of the distribution of the parts produced. For example, if the manufacturing process is becoming less well controlled with regards to a particular attribute (due to a variation in environmental factors, for example) then a group of parts will show on average an attribute of interest having a greater variation with respect to the mean value of that attribute that will be evidenced by an increase in the standard deviation. Therefore, a pro-active inventory control process can be utilized to compensate for any drift in the manufacturing process that can help to maintain a process yield within an acceptable range by monitoring the nature of the distribution of candidate components (using the standard deviation of the parts produced as an indicator) and adjusting the nature of the distribution(s) accordingly.

Figure 2A:
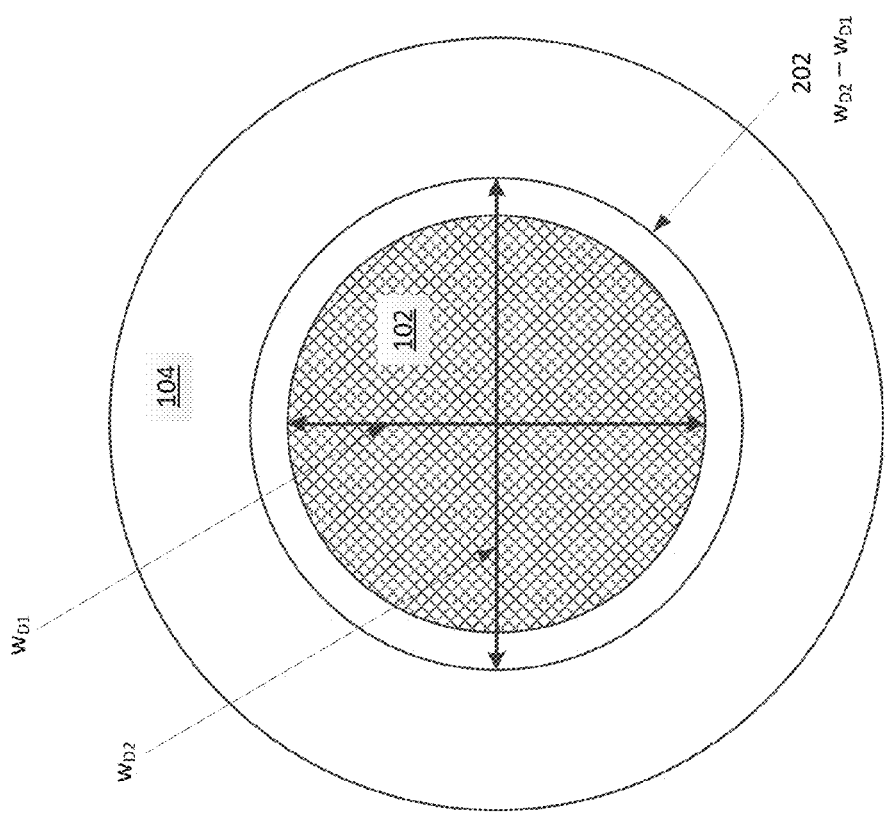

These concepts can be demonstrated using FIGS. 2A and 2B that show peg 102 and collar 104 in more detail especially with the relationship between outer diameter $W_{D1}$ and inner diameter $W_{D2}$. In this situation, assembly yield $Y_a$ can be defined in terms of the probability of finding a best fitting part from a group of N candidate parts for an incoming part. In other words, for an incoming part in the form of collar 104, any candidate part in the form of peg 102 will positively contribute to assembly yield $Y_a$ in accordance with Eq. (2):

$$W_{D1} < W_{D2} \quad \text{Eq. (2)}.$$

However, in some instances, an attribute of interest can be relational. For example, still referring to FIG. 2A, if the attribute of interest is gap value (GV) of gap 202 can be represented as the difference between inner diameter $W_{D2}$ (of collar 104) and outer diameter $W_{D1}$ (of peg 102) according to Eq. (3):

$$GV = W_{D2} - W_{D1} \quad \text{Eq. (3)}.$$

As shown in FIG. 2B, for cosmetic or other reasons, it may be desirable to constrain gap value GV to a narrow range of possible gap values. In this way, gap value GV can be evaluated for acceptability by comparing gap value GV with a range of acceptable gap values that can be substantially smaller than the potential range of best fit matches between collar 104 and peg 102. This range of acceptable values (represented by "∂") can correspond to an outgoing specification along the lines of a design specification. In this way, only those candidate components that can satisfy the design specification in accordance with Eq. (4) can be considered acceptable and can positively contribute towards an effective assembly yield $Y_{eff}$:

$$GV = W_{D2} - W_{D1} < \partial \quad \text{Eq. (4)}.$$

It should be noted that since assembly yield $Y_a$ is generally less than (or at best equal to) effective yield $Y_{eff}$, any assembled part (such as finished product 106) that does not meet the design specification can be considered an outgoing reject and must either be re-worked or rejected entirely. In this way, a substantial amount of processing resources that have been allocated is essentially wasted. Therefore, maintaining assembly yield $Y_a$ and effective yield $Y_{eff}$ as close as possible is an important consideration in any manufacturing process.

Figure 3:
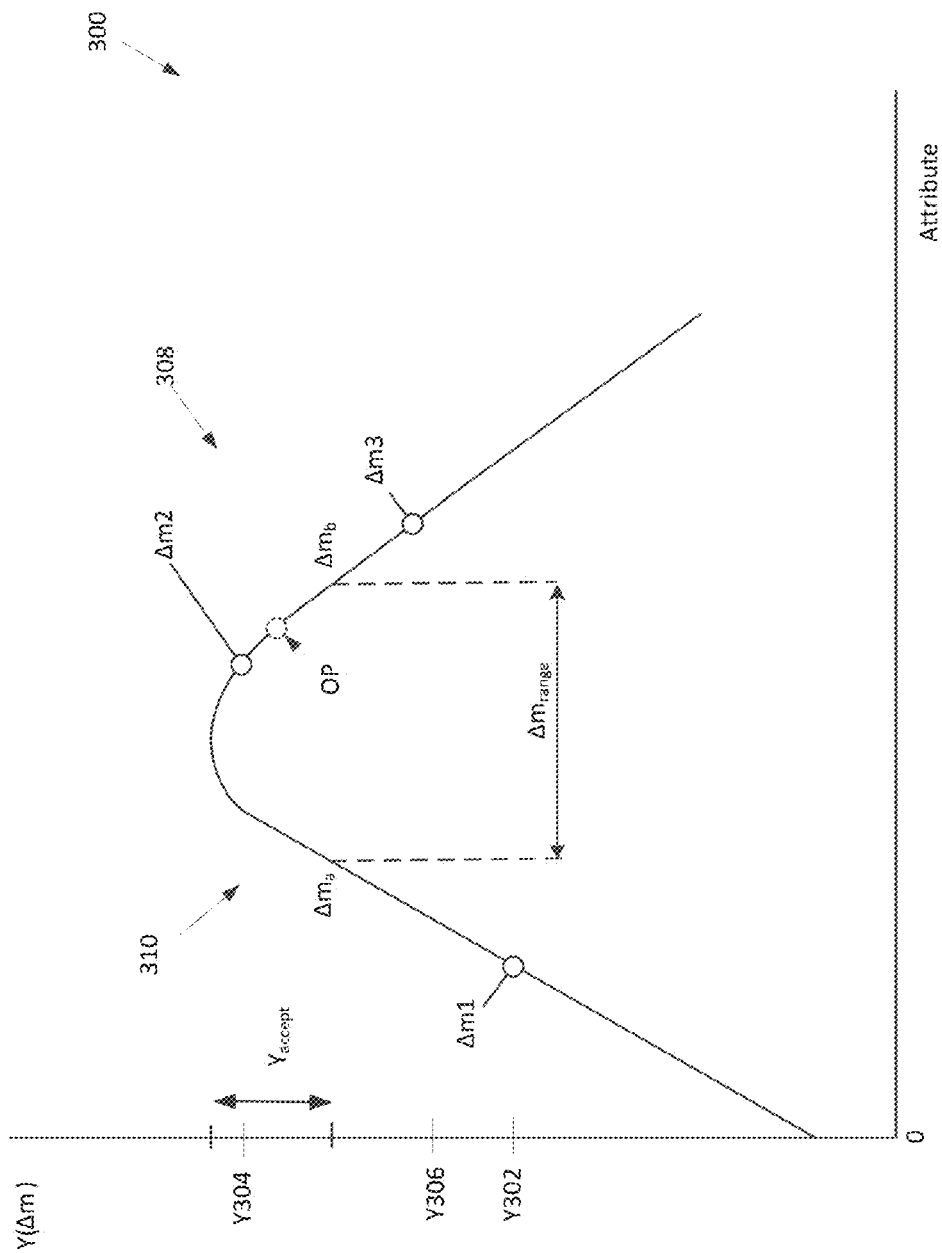
FIG. 3 shows representative yield curve in accordance with the described embodiments.

For reasons stated above, assembly yield $Y_a$ can be dependent upon drift in the processes used to manufacture either peg 102 or collar 104. For example, FIG. 3 shows representative yield curve 300 associated with a specific attribute (such as gap value GV) in accordance with the described embodiments. It should be noted that the characteristics of yield curve 300 can depend upon a relationship between the distribution of both incoming parts and a group of N candidate parts. assembly yield Ya can be a function of mean value offset $\Delta m$ in accordance with Eq. (5):

$$Y_a = Y_a(\Delta m) \quad \text{Eq. (5)}.$$

As illustrated in FIGS. 4A-4C, (presuming all distributions described are essentially normal), distributions 402 and 404 can be related to assembly yield $Y_a$ using a mean value "offset" that can be embodied as a difference in mean values of each distribution in accordance with Eq. (6):

$$\Delta m = m_{402} - m_{404} \quad \text{Eq. (6)}.$$

Referring back to FIG. 3, from the results of FIGS. 4A-4C, it is evident that there is a range of mean value offsets that can be associated with what can be considered an acceptable assembly yield $Y_{accept}$. For example, offset value $\Delta m_1$ corresponding assembly yield $Y_{302}$ can be less than assembly yield $Y_{304}$ associated with offset value $\Delta m_2$ which, in turn, is greater than assembly yield $Y_{306}$ associated with offset value $\Delta m_3$. Therefore, a range of offset values (shown as $\Delta m_a$ to $\Delta m_b$) can be used to modify distributions 402 and 404 in order that assembly yield Ya remains within the acceptable range of assembly yield associated with acceptable assembly yield $Y_{accept}$. It should be noted that it is preferable for most assembly operations for operating point $OP_1$ be located on a portion 308 of yield curve 300 having a shallow slope as compared to portion 310 thereby mitigating to some extent variations in manufacturing processes. Various inventory control protocols along the lines discussed below can be used to maintain a corresponding assembly process in acceptable regime.

The following discussion provides a more detailed description of the selection process during an assembly operation in which an attribute, or attributes, of a part is determined and a search for a corresponding part that most closely matches the measured attribute(s) is performed. More generally, the search can be based upon what is referred to as a merit function M. Merit function M can be related to various parameters in accordance with Eq. (7):

$$M = M(\omega_i, A_i) \quad \text{Eq. (7)};$$

where: $\omega$ is a weighting factor; and
$A_i$ is selection attribute.

The selection attribute can be any parameter used as a selection criterion of choosing a best matching part. For example, selection attributes can be size (diameter of peg 102 for example), color, texture, gap distance, and so on. There can be any number of selection attributes used to choose a best match for a particular process. It should be noted, however, that as the number of attributes increases, so does the number of parts required in a part buffer and also the amount of selection resources (both time and computation) required. Moreover, in some embodiments, weighting factor $\omega_i$ can be used to provide relative weights between various attributes. For example, if for a particular assembly process, an attribute associated with color is substantially more important than texture, then a weighting factor for the color attribute can be greater than that for the texture attribute. Therefore, the judicious choice of selection attributes can be an important factor in an efficient implementation of the selection and assembly process.

As described above, merit function M can be multi-dimensional having various attributes such as color, size, rotation that form components in what can be referred to as a multi-dimensional attribute space $S_A$ graphically illustrated in FIG. 5 as attribute space 500 showing a generalized point 502. In this implementation, point 502 can represent a point in attribute space 500 having generalized attribute coordinates $\{\omega_i, A_i\}$ that can be associated with merit function $M\{\omega_i, A_i\}$ as in Eq. (7) where i is the number of attributes. Also shown are the projections of merit function M onto corresponding attribute axes $a_1$, $a_2$, and $a_3$.

Therefore in an automated manufacturing process, by using merit function M to select best fitting part, component parts can be manufactured with slack manufacturing tolerances but can sustain high effective yields without the need to sort or pre-sort. Moreover, an additional degree of quality control can be achieved by determining if the incoming part will have any match and if not, it can be discarded immediately thereby preserving valuable manufacturing resources. In this way, by applying merit function M it can be assured that incoming parts can be matched with a best fit counterpart that meets all design specs even though the manufacturing specs used to create the parts are looser than the target design spec. Accordingly, the number of parts required to populate a buffer can be a function of the number of attributes as well as the ratio of the design tolerance to the manufacturing capability. For example, a tight tolerance coupled with a loose manufacturing capability will require a greater number of parts to meet a corresponding design tolerance. Also, as the number of attributes increases, the number of parts required can also increase.

Figure 6A:
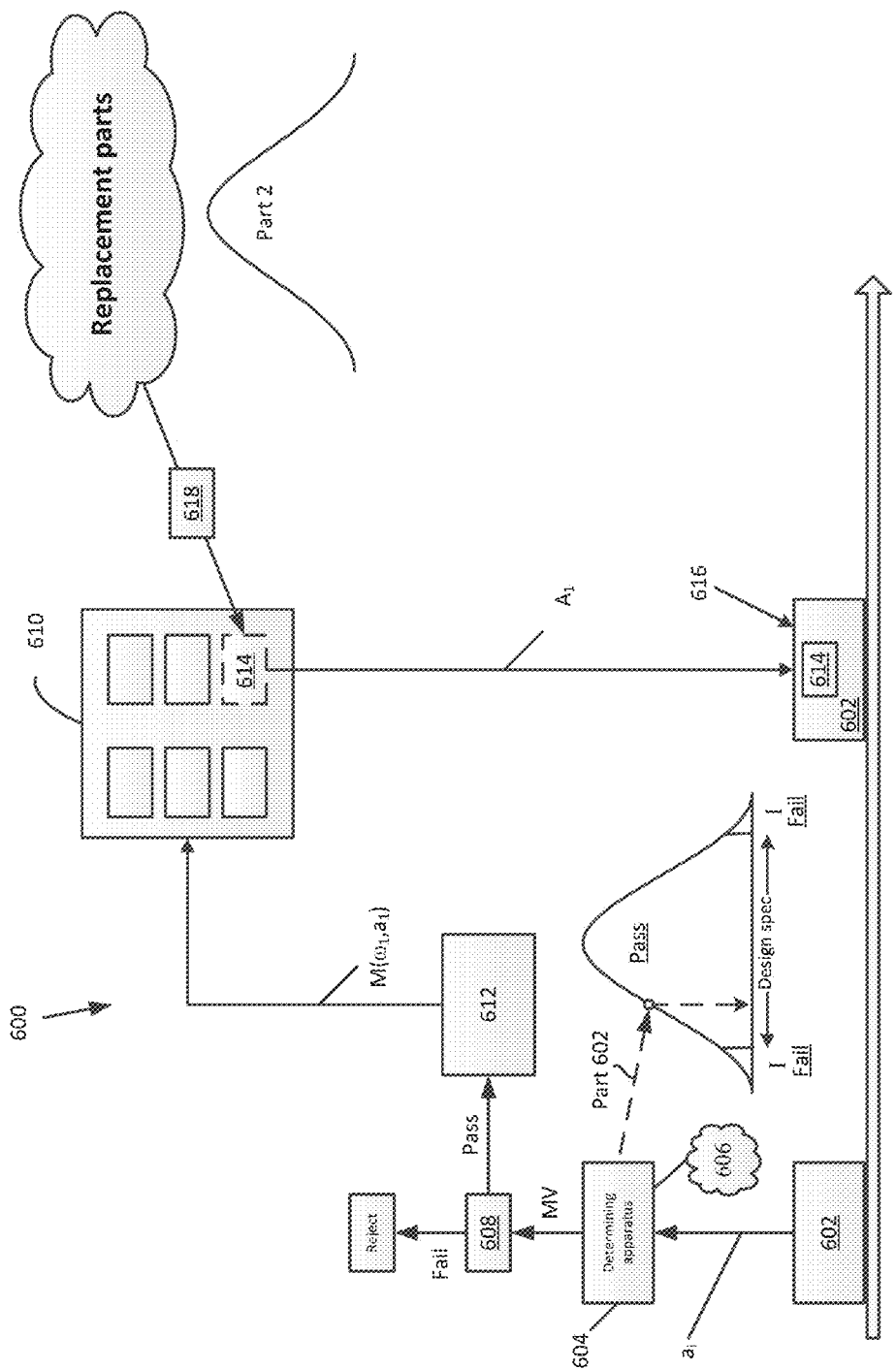
FIGS. 6A-6B shows representative assembly process and apparatus, respectively, in accordance with the described embodiments.

FIG. 6A graphically illustrates representative manufacturing operation 600 in accordance with the principals discussed above. Operation 600 can be used to manufacture any number of products using any number of components using any number of attributes. However, for the sake of clarity, operation 600 will be described in terms of basic manufacturing operation that teaches a single incoming part being matched with a single component based upon a single attribute. In this example, incoming part 602 can be evaluated by determining apparatus 604 for attribute $A_1$. Attribute $A_1$ can be any suitable attribute related to a measurable property of incoming part 602. Attribute $A_1$ can be a size of incoming part 602 (or size of a particular aspect of incoming part 602), the color of incoming part 602, and so on.

In some situations, the measured attribute can be relational in that a measured property of incoming part 602 can be used in relation (i.e., compared to) to a measured property of a candidate part. One such relational attribute can be a measure of a degree of parallelism between portions of incoming part 602 and a selected best fit part. The degree of parallelism can be used as a selection criterion for choosing the best fitting part. Referring again to peg 102 and collar 104, an attribute that can be ascribed to peg 102 is circular conformity. In other words, how close does peg 102 (or collar 104) conform to a geometric circle? By comparing radii of curvature at selected points between peg 102 and collar 104, a measure of parallelism can be defined that provides an indication of just how well peg 102 fits into collar 104. In other words, the degree of conformity can also provide an indication of the uniformity of gap 202 between peg 102 and collar 104 in finished product 106.

Referring back to FIG. 6A, incoming part 602 can be scanned by determining apparatus 604. Determining apparatus 604 can be sensitive to a chosen attribute. For example, if the chosen attribute is viewable using an image capture device, then determining apparatus 604 can take the form of a camera. On the other hand, if the chosen attribute is temperature based, then determining device 604 can take the form of a thermal sensor such as an IR sensor, thermometer, etc. For the remainder of this discussion and without loss of generality, determining apparatus 604 is presumed to take the form of a visible light camera 604. In this way, camera 604 can optically scan incoming part 602. In one embodiment, camera 604 can utilize processing resources (either on-board or external) to convert images captured by camera 604 into a set of measured values (MV) that will be referred to hereinafter as to as data cloud 606. Data cloud 606 can represent a virtual rendering of incoming part 602 as the set of measured values (MV) can be used to digitally "reconstruct" incoming part 602. For convenience as well as computational efficiency, data cloud 606 can be stored locally at camera 604 or in an external data base (not shown) for later use. In any case, data cloud 606 can be digitally processed using available computational resources. In one embodiment, processing of data cloud 606 can involve comparing data cloud 606 (or a representative sample of the measured values MV) to a reference datum (such as a CAD data) used to define the geometric structure of incoming part 602 and more particularly, that aspect related to selected attribute A1. In one embodiment, the reference datum can correspond to a mean value of a statistically significant number of incoming parts. In this way, the comparison can provide a measure of the dispersion about the mean m of incoming parts 602 and provide an indication of the nature of the distribution of incoming parts with respect to the attribute of interest.

In one embodiment, a representative sample of data cloud 606 in the form of measured values MV can be compared to a set of threshold measured values. In one embodiment, the set of threshold values can correspond to those measured values of selected attribute A1 for which a best fitting part is not available. For example, when incoming part 602 is scanned by camera 604, a representative sample of the measured values MV can be forwarded to comparator 608 that can compare the measured values received to threshold values. If comparator 608 determines that a pre-determined number of measured values are outside of an acceptable range and fall into what is shown as Region I, then incoming part 602 can be removed from assembly process 600. In this way, valuable time and computational resources will not be wasted on incoming parts that cannot be matched with a corresponding best fitting part. Moreover, this concept can be extended to using an outgoing quality specification in that those incoming parts that are determined to not be able to meet an outgoing quality check when matched with an available best fitting part, the incoming part can be removed from assembly process 600. This determination can be based upon the scanned characteristics of incoming part 602 and a data base of known characteristics of parts available for potentially matching incoming part 602. If there is no available matching part, then incoming part 602 can be set aside for a subsequent attempt at matching. However, in this situation, the incoming parts removed from assembly process 600 can be set aside if and until matching parts can be found that when used will meet the outgoing quality criteria.

In those situations where incoming part 602 has been determined to be acceptable in that there is at least one matching part in buffer 610 of N parts, then selector 612 identifies and selects part 614 having an attribute A1 that satisfies merit function M that is then matched with incoming part 602 to form assembled part 616. It should be noted that by best fit it is meant that of N parts in buffer 610, selector 612 will select part 614 having characteristics that most closely match those called out in merit function M but not necessarily a "perfect" match, therefore the notation MO to indicate that the matching characteristics are not necessarily an exact match but are nonetheless the "best" match of the N parts available in buffer 610. It should be noted that prior to inclusion in buffer 610, each of the N parts included therein were scanned and characterized and the corresponding data stored and made available to selector 612. Once part 614 has been identified, replacement part 618 replaces best fitting part 614 previously removed from buffer 610. In this way, the number of parts in buffer 610 remains substantially unchanged thereby maintaining an incoming yield at an acceptable level.

It should be noted that after a period of time that depends in part upon the number of parts in buffer 610, once a substantial number of the best fitting parts are removed from buffer 610, the remaining parts will tend to be associated with portions of the distribution having characteristics that are less likely to satisfy the merit function of an incoming part. In other words, the distribution of parts within the buffer becomes distorted with respect to the distribution of incoming parts and the probability of finding a part in the buffer that is a best fit to an incoming part becomes less. Therefore, in order to assure consistent and acceptable yields, an inventory control protocol can use buffer rebalancing to improve the number of best matching parts in buffer 610 thereby increasing the monitored yield. The monitored yield can indicate a probability that an incoming part can be matched successfully with a part in buffer 610. By successful it is meant that the attribute of the best matching second part is within an acceptable range of attribute values (akin to a design spec).

The rebalancing of buffer 610 can take many forms. For example, in one embodiment, replacement parts can be "pre-binned" prior to being placed into buffer 610. By pre-binned it is meant that the distribution of buffer 610 can be modified by selecting replacement parts (parts that replace those selected) that are selected prior to inclusion in buffer 610 to have an attribute value in accordance with the attribute value of the part selected. In this way, the mean of the distribution of the parts in buffer 610 can be made closer to that of the parts most likely to be selected. This rebalancing of buffer 610 can improve yield by preferentially pre-selecting those replacement parts more likely to be selected than would replacement parts selected in a less directed, or more random manner.

In another embodiment, the distribution of parts in buffer 610 can be selectively modified by removing one or more parts from buffer 610 that have remained in buffer 610 a period of time greater than a pre-determined amount of time. In other words, those parts in buffer 610 that have not been selected are more likely than not representative of a part having an attribute value that falls out of the range of attribute values consistent with a best matching part. In this way, by removing those "oldest" parts from buffer 610 to be replaced with parts having an attribute value closer to one that would merit a match can have the effect of increasing overall yield. In other words, removing those parts in buffer 610 that have less desirable attributes can result in an increase in yield. It should be noted, however, that the parts removed can be sequestered for a later time when, perhaps, the attribute value distribution of incoming parts has shifted in such a way that renders the sequestered parts "more desirable".

It should be noted, however, that the "age" of a part in buffer 610 can represent but one of many attributes that can be used to mark those parts in buffer 610 that possess attribute value(s) that render them undesirable with respect to the attribute values of the incoming parts. For example, some of the attributes that can be used to identify less desirable parts in buffer 610 can include a part size, a degree of mis-match with the incoming parts (i.e., the parts in buffer 610 that are the "worst matched"), and so on.

Figure 6B:
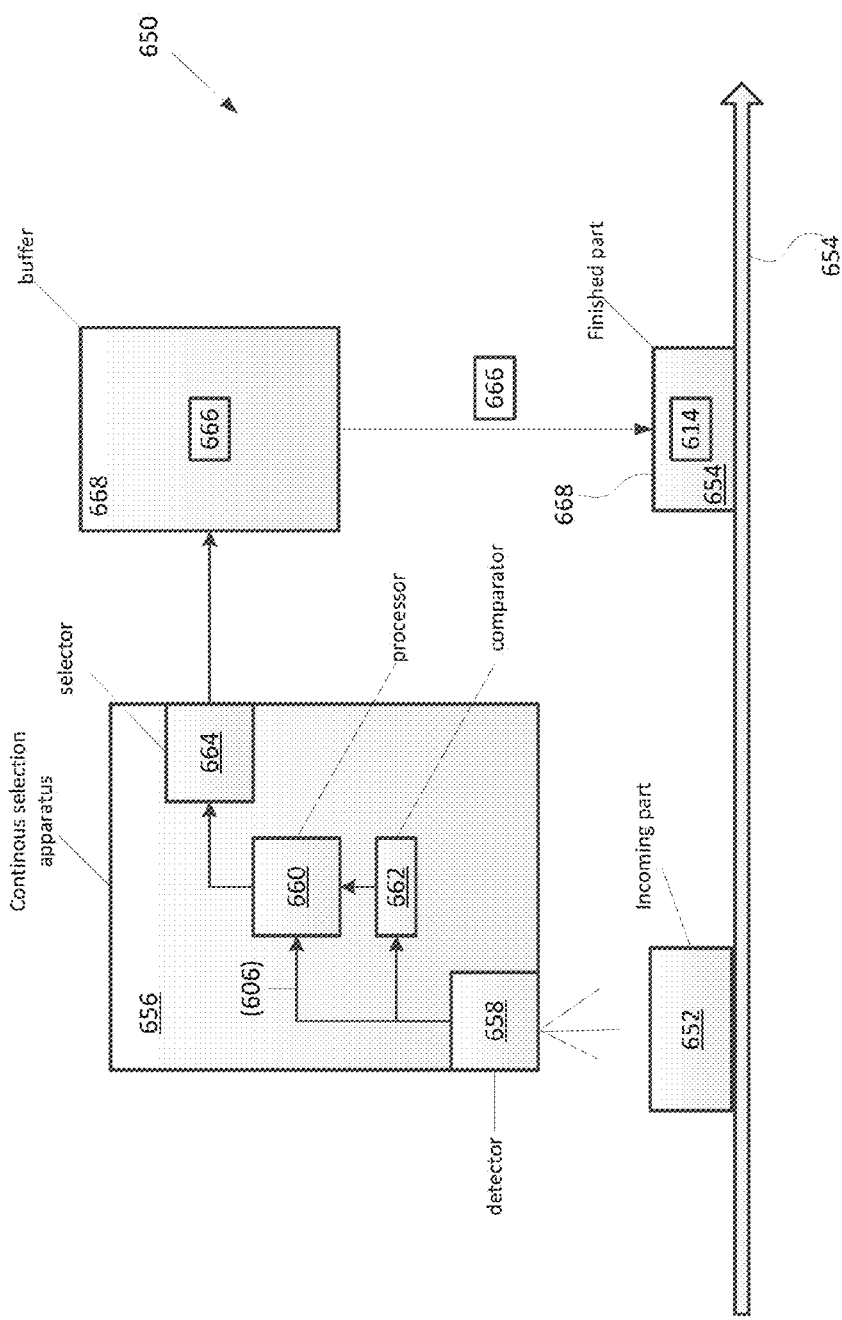

FIG. 6B graphically illustrates a manufacturing assembly operation 650 in accordance with the described embodiments. Operation 650 can be carried out using well known assembly equipment such as pick and place machines, robotic handlers, optical sensors such as cameras, and so on. Accordingly, first part 652 can be transported by transport mechanism 654. Transport mechanism 654 can take many forms. For example, transport mechanism 654 can take the form of a conveyer belt configured to carry first part 652 from a loading area (not shown) to the operation area in which assembly operation 650 can be carried out. Continuous selection apparatus 656 can include a number of operational modules and can take many forms. For example, continuous selection apparatus 656 can be distributed in nature by which it is meant that particular operational modules can be located where most efficiently used and be in communication with each other. In other embodiments, continuous selection apparatus 656 can be essentially a single unit having multiple components included therein (as shown in FIG. 6B). In some cases, continuous selection apparatus 656 can be any appropriate combination thereof.

As shown in FIG. 6B, continuous selection apparatus 656 can include determining apparatus 658 configured to determine a particular attribute, or attributes, of first part 652. The attribute can be any tangible aspect of first part 652 such as size, weight, color, smell, etc. It should be noted that determining apparatus 658 can be sensitive to one or more attributes and as such can provide a multi-dimensional data stream to computational unit 660 configured to store and process data. In this way computational unit 660 can provide a virtual rendering of first part 652 (along the lines of data cloud 606. Computational unit 660 can be in communication with comparator 662 that can be used to determine if the attributes of first part 652 are deemed to be acceptable in that the attribute(s) is within a range of acceptable attributes.

Once comparator 662 determines (with the assistance of computational unit 660, if need be) that first par 652 is acceptable, by which it is meant that the attribute(s) of part 652 is within a range of acceptable attribute values. Once deemed acceptable, instructions can be sent to selector unit 664 configured to identify and select a best matching part 666 from buffer 668. Selector unit 664 can take many forms such as a pick and place machine. Selector unit 664 can then transport selected part 666 to transporter 654 (or equivalent) for assembly with first part 652 to form finished part 668.

FIG. 7 shows a flowchart detailing process 700 in accordance with the described embodiments. Process 700 can be carried out by receiving an incoming part at 702. At 704, an attribute, or attributes, used to select a best matching part from a buffer of N parts can be associated with the incoming part. At 706, the incoming part can be scanned to determine an attribute value, or values, of the incoming part. At 708, the attribute value, or values, can be compared to database to determine if there is any part in the buffer that can be matched with the incoming part and meet acceptable criteria. For example, if the assembled part is subject to an outgoing quality check based upon, for example, a design specification, is there any part in the buffer that can be matched with the incoming part that will meet the design specification. If, at 708, it is determined that there is no part in the buffer that can be matched, then at 710, a determination is made if the incoming part is to be sent for subsequent processing. By subsequent processing, it is meant that although that there is no matching part currently in the buffer that will present an acceptable match for the incoming part, then the part can be held until such time that re-balancing the buffer will provide a matching part, then the incoming part is sent to recycle at 712, otherwise, the incoming part is rejected at 714.

Returning 708, if the incoming part is determined to be acceptable, then at 716, a determination is made if there is a best fitting part in the buffer. If there is a best fitting part in the buffer, then the best fitting part is selected at 718 and a replacement part is added to the buffer at 720. Returning back to 716, if it is determined that there is not currently a best fitting part in the buffer, then the incoming part is recycled at 712.

Figure 8:
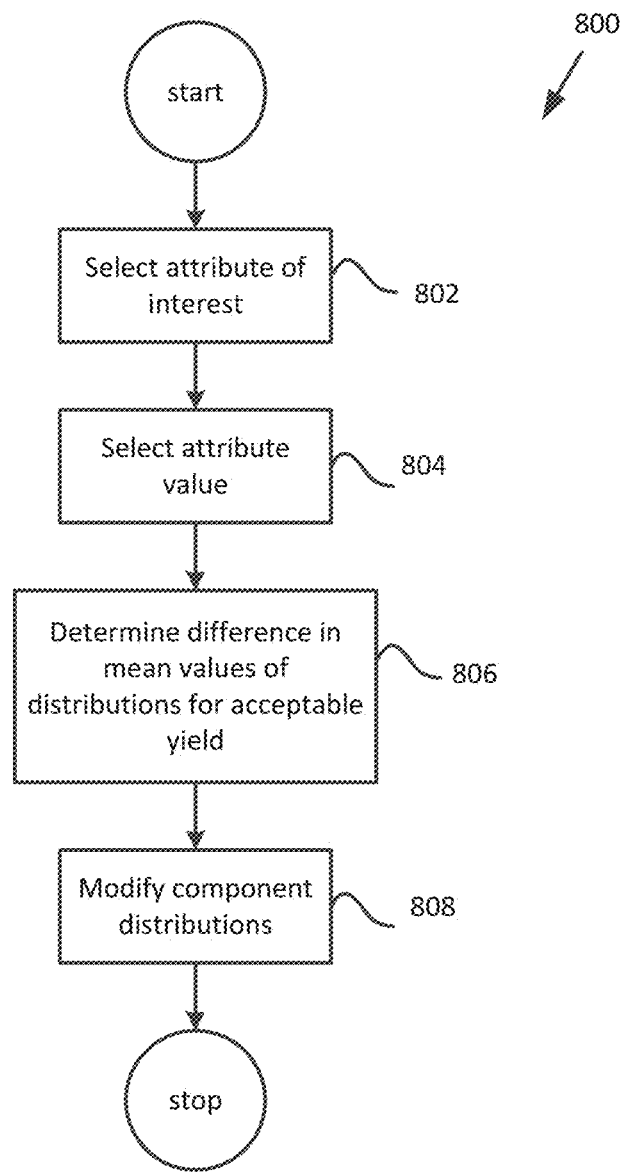
FIG. 8 shows a flowchart describing process for determining mean offset values for providing an optimal range of assembly yield to compensate for manufacturing process drift.

FIG. 8 shows a flowchart describing process 800 for determining mean offset values for providing an optimal range of assembly yield to compensate for manufacturing process drift. Process 800 can begin at 802 by selecting an attribute of interest. At 804, a desired value of the selected attribute is chosen At 804, mean offset values corresponding to an acceptable range of assembly yields is determined and at 808, distributions of incoming component and components in a buffer for storing candidate matching components are modified in accordance with the mean value offsets.

Figure 9:
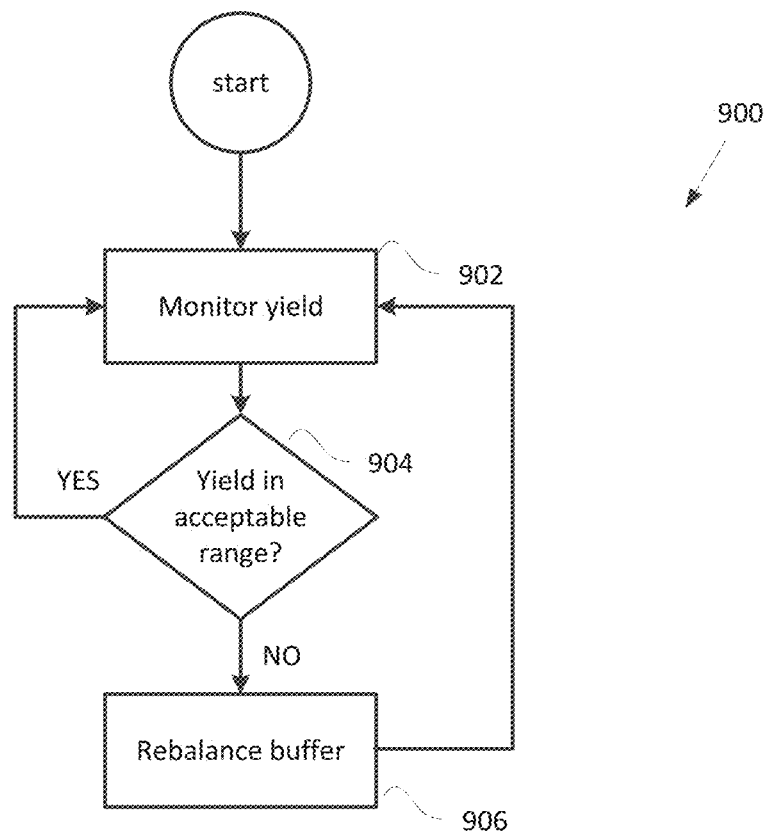
FIGS. 9-12 show representative inventory control protocols used to optimize assembly yield in accordance with the described embodiments.
Figure 10:
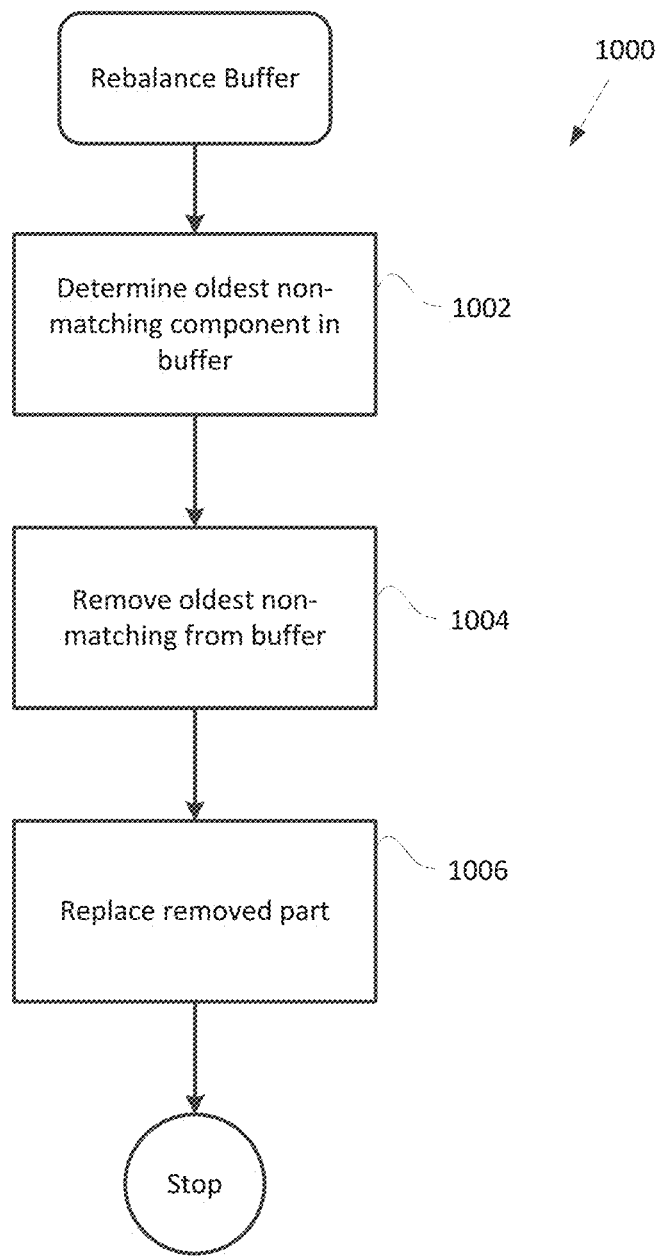
Figure 11:
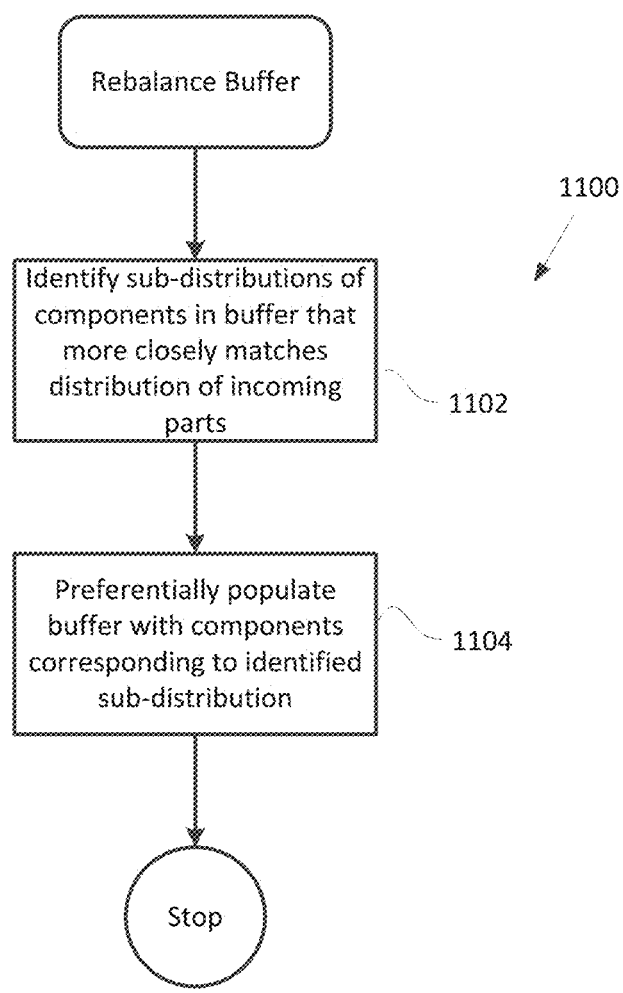

FIGS. 9-11 show representative inventory control protocols used to optimize assembly yield in accordance with the described embodiments. FIG. 9 shows a flowchart detailing process 900 for monitoring assembly yield. Process 900 begins at 902 by monitoring yield. In the described embodiment, monitored yield can be defined as a probability of an incoming first part having an associated best matching second part in a buffer having attributes within an acceptable range of attribute values (akin to a design spec). In this way, even if the first part has a best match in the buffer, the combination would not meet outgoing requirements, therefore, the first part is deemed to not have an effective best match. When at 904 it is determined that the yield is not acceptable, then the buffer of parts used to provide a best fit for an incoming part is re-balanced in accordance with any processes described by flowcharts shown in FIGS. 10-11.

In one embodiment, buffer rebalancing can include identifying the parts in the buffer that have remained unmatched for the longest period of time and removing those so identified. Accordingly, FIG. 10 shows a flowchart detailing process 1000 for determining an oldest non-matching component in the buffer begins at 1002 by evaluating an amount of time that each part in the buffer has remained unmatched. At 1004, the oldest non-matching part in the buffer is identified and removed. The removed oldest part is then replaced at 1006. In one embodiment, the removed part is subsequently recycled whereas in another embodiment, the removed part is sequestered until and if parts are received having attributes that render the sequestered part more "desirable".

FIG. 11 shows a flowchart detailing process 1100 that modifies the distribution of parts in the buffer in an attempt to more closely align the distribution of parts in the buffer with the incoming parts. At 1102, sub-distributions (i.e., binning) of components in the buffer that more closely matches the distribution of incoming parts are identified. At 1104, the buffer is preferentially populated with components corresponding to the identified sub-distributions.

Figure 12:
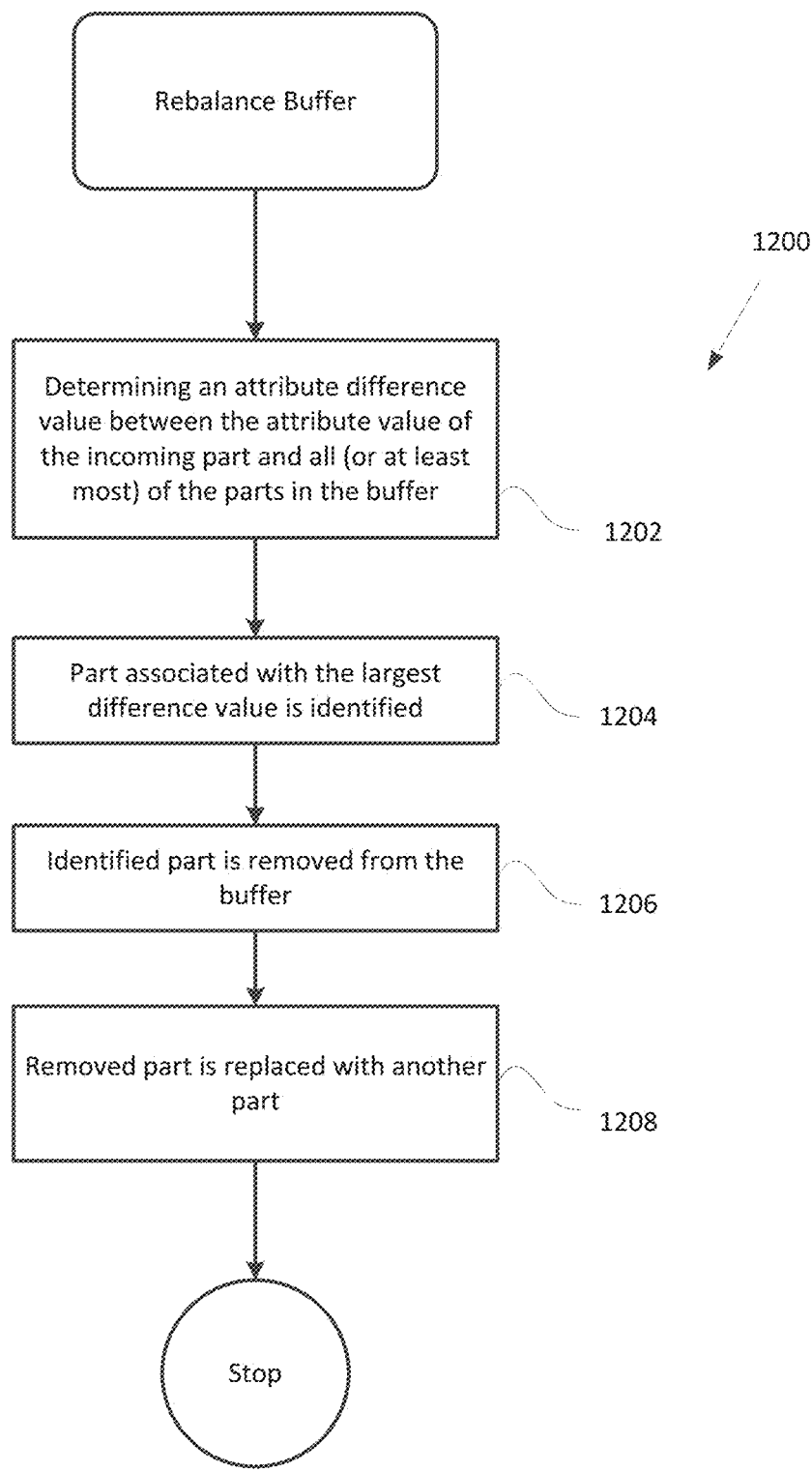

In one embodiment, buffer rebalancing can include identifying the parts in the buffer that are the "worst" matching in that those part having attribute values that differ the most from the attribute values of the incoming parts are removed from the buffer. Accordingly, FIG. 12 shows a flowchart detailing process 1200 for determining a worst matching part in the buffer that begins at 1202 determining an attribute difference value between the attribute value of the incoming part and all (or at least most) of the parts in the buffer. At 1004, the part associated with the largest difference value is identified. At 1006, the identified part is removed from the buffer and at 1008, and replaced with another part. In one embodiment, the replacement part can be pre-binned so as to modify a mean value of the distribution of parts in the buffer to more closely align with the mean value of the incoming parts.

Figure 13:
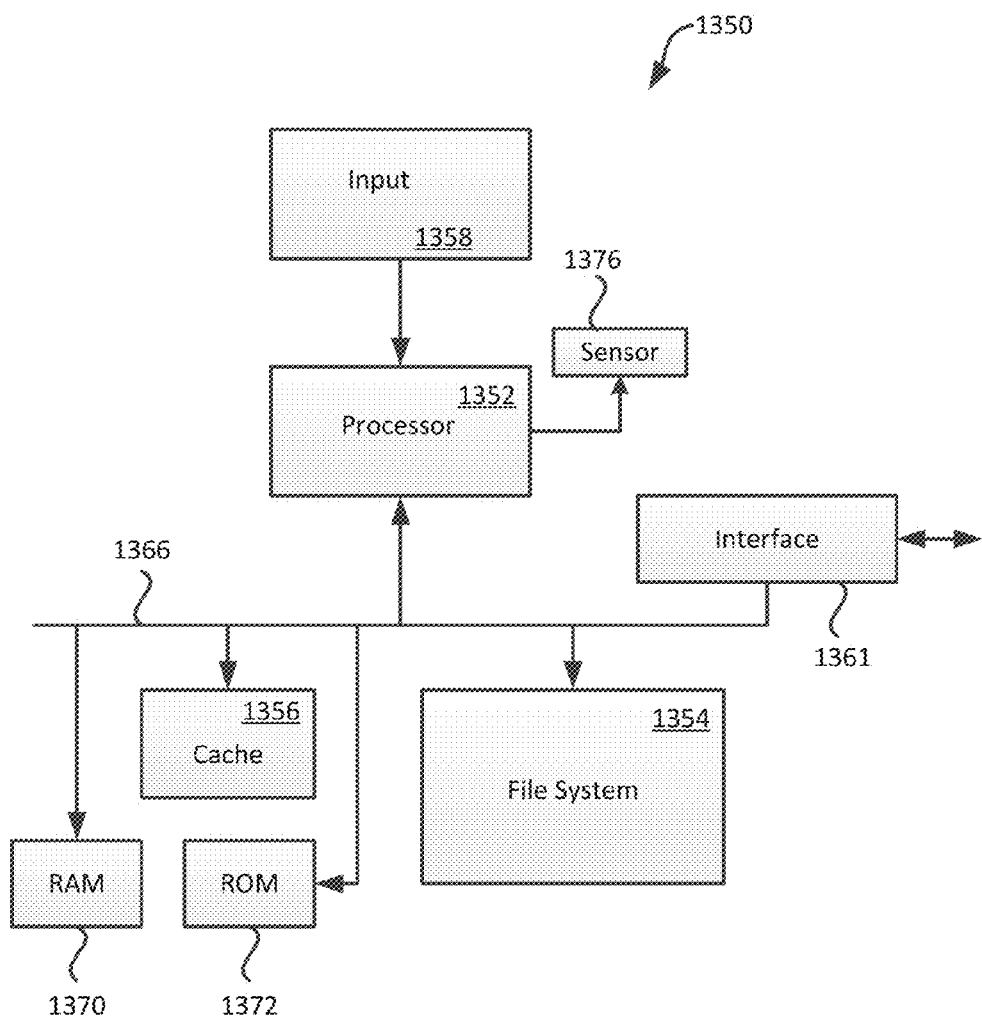
FIG. 13 is a block diagram of an electronic device suitable for use with the described embodiments.

FIG. 13 is a block diagram of a computer device 1350 suitable for use with the described embodiments. The computer device 1350 illustrates circuitry of a representative computing device. The electronic device 1350 includes a processor 1352 that pertains to a microprocessor or controller for controlling the overall operation of the electronic device 1350. The electronic device 1350 stores media data pertaining to media items in a file system 1354 and a cache 1356. The file system 1354 is, typically, a storage disk or a plurality of disks. The file system 1354 typically provides high capacity storage capability for the electronic device 1350. However, since the access time to the file system 1354 is relatively slow, the electronic device 1350 can also include a cache 1356. The cache 1356 is, for example, Random-Access Memory (RAM) provided by semiconductor memory. The relative access time to the cache 1356 is substantially shorter than for the file system 1354. However, the cache 1356 does not have the large storage capacity of the file system 1354. Further, the file system 1354, when active, consumes more power than does the cache 1356. The electronic device 1350 can also include a RAM 1370 and a Read-Only Memory (ROM) 1372. The ROM 1372 can store programs, utilities or processes to be executed in a non-volatile manner. The RAM 1370 provides volatile data storage, such as for the cache 1356.

The electronic device 1350 also includes a network/bus interface 1361 that couples to a data link 1362. The data link 1362 allows the electronic device 1350 to couple to a host computer or to peripheral devices such as a robot. The data link 1362 can be provided over a wired connection or a wireless connection. In the case of a wireless connection, the network/bus interface 1361 can include a wireless transceiver.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed.

It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A manufacturing process of forming a housing for a portable electronic device by mating a first housing part with a second housing part during a pick and place operation, the manufacturing process comprising, at an assembly system:
   during the pick operation that is performed by the assembly system:
      determining a weighted attribute value of the first housing part, wherein the first housing part is characterized as having attributes, and the weighted attribute value is based on prioritizing at least one of the attributes over any remaining attributes;
      determining a difference between the weighted attribute value of the first housing part and respective weighted attribute values of second housing parts included within a group of the second housing parts, wherein the group of the second housing parts having a continuous distribution of attribute values;
      identifying a second housing part from among the group of the second housing parts that is associated with a strongest match value by comparing the difference to a design tolerance range; and
   during the place operation that is performed by the assembly system:
      removing the second housing part that is associated with the strongest match value from the group of the second housing parts, and
      mating the first housing part with the second housing part.

2. The manufacturing process of claim 1, further comprising:
   during a post assembly inspection:
      inspecting the first and second housing parts for compliance to a design specification.

3. The manufacturing process of claim 1, further comprising:
   rejecting the first housing part when the first housing part not operable as designed.

4. The manufacturing process of claim 1, further comprising:
   determining an age of each of the second housing parts included within the group of the second housing parts, wherein the age corresponds to a number of selection events where the second housing part remains unselected.

5. The manufacturing process of claim 4, further comprising:
   removing an oldest second housing part from the group of the second housing parts.

6. The manufacturing process of claim 5, further comprising:
   replacing the oldest second housing part with a replacement second housing part.

7. The manufacturing process of claim 1, further comprising:
   modifying the weighted attribute value of the first housing part with a corresponding weighting factor.

8. An assembly system for forming a housing for a portable electronic device, comprising
   a comparator unit of the assembly system configured to determine a weighted attribute value of a first housing part, wherein the first housing part is characterized as having attributes, and the weighted attribute value is based on prioritizing at least one of the attributes over any remaining attributes;
   a memory of the assembly system configured to store the weighted attribute value of the first housing part;
   an attribute value difference value generator of the assembly system that is arranged to determine a difference between the weighted attribute value of the first housing part and respective weighted attribute values of second housing parts included within a group of the second housing parts, wherein the group of the second housing parts have a continuous distribution of attribute values;
   a selector unit of the assembly system that is configured to (i) identify a second housing part from among the group of the second housing parts that is associated with a strongest match value by comparing the difference to a design tolerance range, and (ii) remove the second housing part that is associated with the strongest match value from the group of the second housing parts; and
   an assembly unit of the assembly system that assembles the first housing part with the second housing part.

9. The assembly system of claim 8, further comprising:
   a reference datum stored in the memory comprising reference geometric data.

10. The assembly system of claim 9, wherein the comparator unit provides a geometric variance value by comparing attributes of an incoming housing part to the reference geometric data.

11. The assembly system of claim 10, wherein the incoming housing part is not matchable when the geometric variance value is greater than a threshold.

12. A non-transitory computer readable medium storing instructions that, when executed by one or more processors of an assembly system, cause the assembly system to execute steps for assembling a housing for a portable electronic device that include:
   determining a weighted attribute value of a first housing part, wherein the first housing part is characterized as having attributes, and the weighted attribute value is based on prioritizing at least one of the attributes over any of the remaining attributes;
   determining a difference between the weighted attribute value of the first housing part and respective weighted attribute values of second housing parts included within a group of the second housing parts, wherein the group of the second housing parts have a continuous distribution of attribute values;
   identifying a second housing part from among the group of the second housing parts that is associated with a strongest match value by comparing the difference to a design tolerance range;
   removing the second housing part that is associated with the strongest match value from the group of the second housing parts; and mating the first housing part with the second housing part.

13. The non-transitory computer readable medium of claim 12 wherein determining the weighted attribute value of the first housing part comprises providing geometric data corresponding to at least a size and a shape of the first housing part.

14. The non-transitory computer readable medium of claim 13, further comprising a reference datum comprising reference geometric data used to determine if the first housing part is matchable.

15. The non-transitory computer readable medium of claim 14, wherein an incoming part is not matchable when a geometric variance value is greater than a threshold, the geometric variance value being a difference between the geometric data and corresponding reference geometric data.

* * * * *